Dec. 3, 1929.  G. H. LELAND  1,737,595

ELECTRIC MOTOR

Filed Sept. 20, 1926    2 Sheets-Sheet 1

INVENTOR.
GEORGE H. LELAND.

ATTORNEY.

Dec. 3, 1929.  G. H. LELAND  1,737,595
ELECTRIC MOTOR
Filed Sept. 20, 1926   2 Sheets-Sheet 2
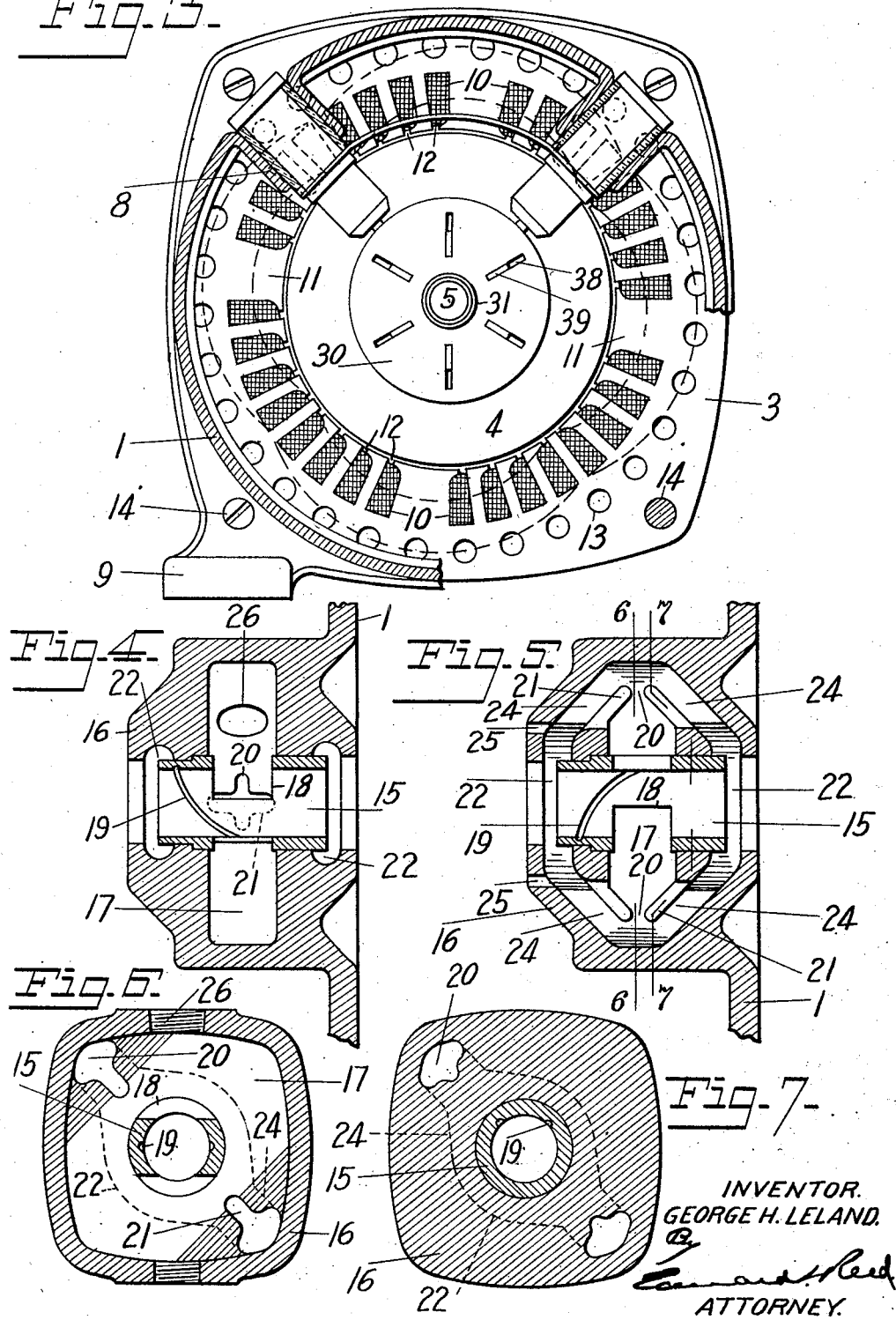
INVENTOR.
GEORGE H. LELAND.
ATTORNEY.

Patented Dec. 3, 1929

1,737,595

UNITED STATES PATENT OFFICE

GEORGE H. LELAND, OF DAYTON, OHIO, ASSIGNOR OF ONE-HALF TO THE LELAND ELECTRIC COMPANY, OF DAYTON, OHIO, A CORPORATION OF OHIO

ELECTRIC MOTOR

Application filed September 20, 1926. Serial No. 136,481.

This invention relates to electric motors and one object of the invention is to provide an electric motor which can be mounted for operation in any one of a plurality of positions and in which the lubricating devices will be of such a character that they will operate with equal efficiency in any position in which the motor is mounted.

A further object of the invention is to provide such a motor which may be mounted in any of a plurality of positions and which may be caused to operate in the desired direction by turning the stator end for end and in which the lubricating device will operate with equal efficiency regardless of the position or direction of operation of the motor.

Other objects of the invention will appear as the motor is described in detail.

Figure 1:
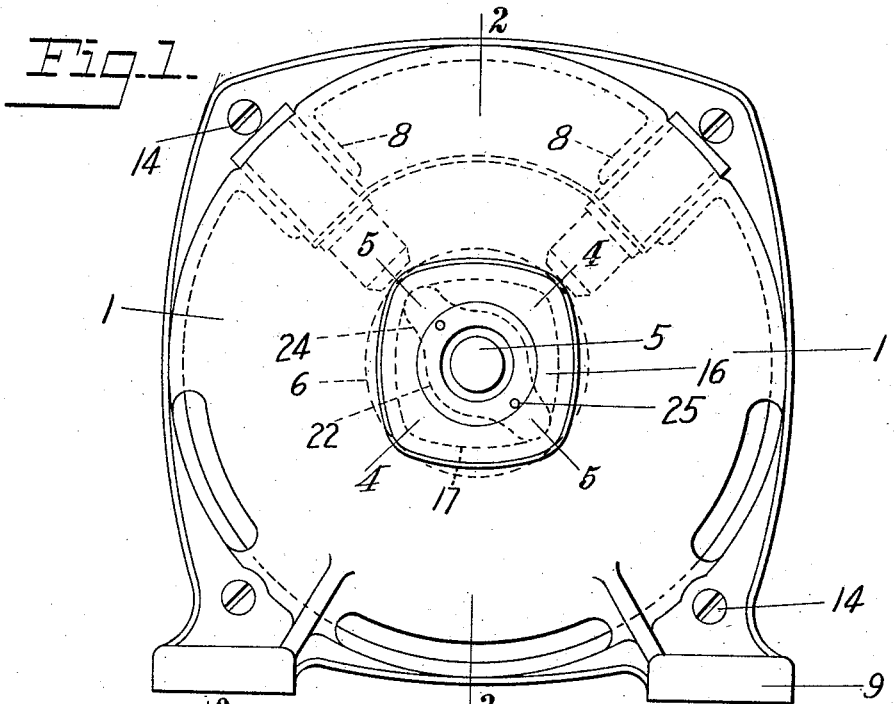
Figure 2:
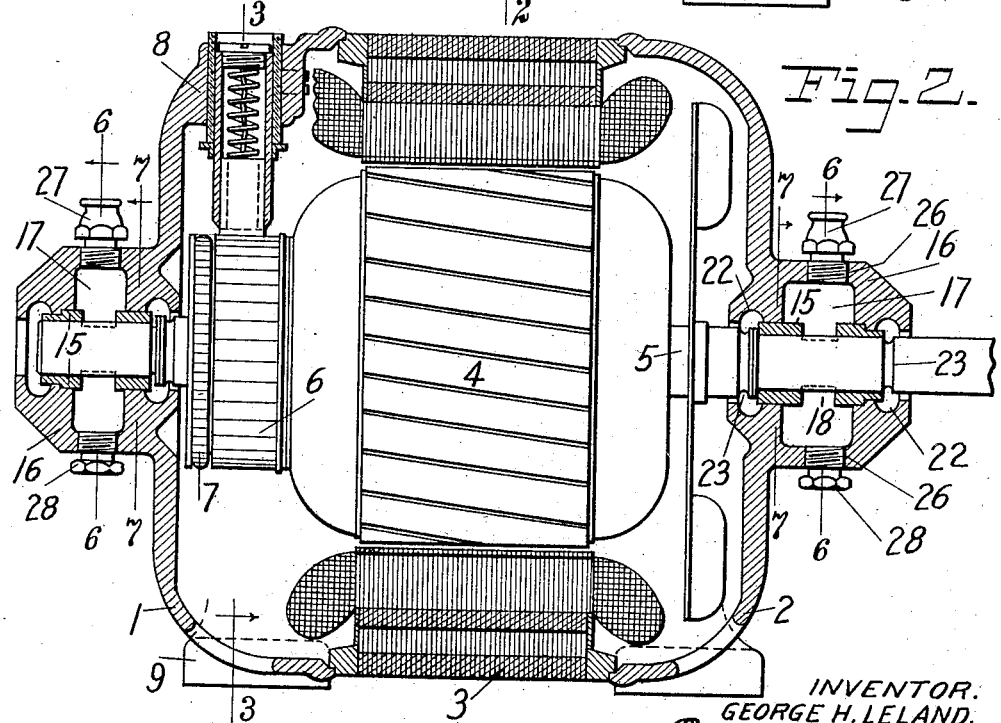

In the accompanying drawings Fig. 1 is an end elevation of a motor embodying my invention; Fig. 2 is a vertical section taken on the line 2—2 of Fig. 1; Fig. 3 is a section taken on the line 3—3 of Fig. 2 with the frame broken away to show the coils in section; Fig. 4 is a section taken through one of the lubricating devices on the line 4—4 of Fig. 1; Fig. 5 is a similar section taken on the line 5—5 of Fig. 1; Fig. 6 is a section taken on the line 6—6 of Fig. 2; and Fig. 7 is a section taken on the line 7—7 of Fig. 2 and of Fig. 5.

In these drawings I have illustrated one embodiment of my invention and have shown the same as applied to a repulsion induction motor of the fractional horse power type but it will be understood that this particular embodiment has been chosen for the purpose of illustration only and that the invention may take various forms and may be applied to motors of various kinds without departing from the spirit thereof.

The motor as here illustrated comprises a casing consisting of end members or caps 1 and 2 and a stator core or ring 3 which is arranged between and supported by the end members 1 and 2, and which constitutes a part of the motor casing. The armature 4 is carried by the usual shaft 5 which is provided at one end with a commutator 6 and a short circuiting device 7 which will operate when the motor reaches its normal operating speed to short circuit the commutator and convert the motor into an induction motor. Brush holders 8 are permanently mounted in fixed positions on the end member 1, these brush holders being here shown as spaced equal distances from the vertical diameter of the stator. The end members or caps 1 and 2 have supporting members or feet 9 by means of which the motor may be mounted either in an upright position, as shown in the drawings, in an inverted position with the supporting members at the top, or in a horizontal position with the supporting members at either side of the motor.

The end members 1 and 2 and the stator 3 are substantially rectangular in shape and the stator is made up of a plurality of laminations which conform in shape substantially to the shape of the stator as a whole and of the end members. Each lamination has a circumferential series of slots 10 to receive the windings of the several coils. These slots are arranged in pairs, the slots of each pair being arranged on opposite sides of the corresponding pole 11. In the present instance, the motor is a multiple pole motor and has four poles and each lamina has four pairs of slots associated with each pole. When the several laminae are secured one to the other to form the stator core the respective slots will be in longitudinal alinement and will form longitudinal grooves in the core. Each slot has at its inner end a relatively small opening 12 through which the windings of the coil may be inserted in the slots and these openings are arranged at those sides of the slots remote from the pole center, thus not only facilitating the winding of the coils but causing the tension on the windings to be in a direction away from the openings, thus avoiding the necessity of using retaining devices to keep the coils in place. The rectangular or square shape of the stator laminae provides ample space for ventilating openings 13 and assembly openings 14.

To reverse the direction of rotation of the motor armature the relative positions of the stator poles and the brushes are changed. In some types of motor this is accomplished by shifting the brush holders, but, in the present construction the brush holders are not adjustable. In other types of motor the adjustment is effected by imparting a partial rotation to the stator about its axis, but in the present construction such a partial rotation of the stator would destroy the design of the motor casing, that is, the corners of the stator would be thrown out of line with the corners of the end members 1 and 2. To enable the direction of the motor to be reversed without shifting the brush holders and without moving the stator about its axis I have so arranged the poles that the direction of rotation of the motor will be reversed by turning the stator end for end, that is, reversing the position of the same with relation to the commutator and brushes. For this purpose the poles 11 of the stator are offset with relation to the vertical and horizontal diameters of the stator and when the stator is turned end for end the several poles will be shifted to the opposite sides of said diameters, thus securing the desired adjustment with relation to the brushes.

The armature shaft 5 is supported in bearings 15 carried by the end members 1 and 2 of the motor casing and these end members preferably have outwardly extending enlargements or housings 16 within which the respective bearings are arranged. Each housing has a lubricant chamber 17 extending about the bearing and these chambers are here shown substantially rectangular in form, the respective side walls of each lubricant chamber being substantially parallel with the corresponding side walls of the end members of the casing. The bearing is provided with openings 18 leading from the chamber 17 to the bearing surface of the shaft 5, this bearing being preferably provided with a spiral groove 19 to conduct a lubricant to the ends thereof. On opposite sides of the bearing, and in the present construction at diametrically opposite corners of the chamber 17, the inner and outer walls of the chamber converge outwardly and are provided at their outermost portions with openings, which, as here shown, comprise intersecting slots 20 and 21. The lubricant chamber is adapted to receive an absorbent material which will retain the oil therein and deliver the same as needed to the bearing and the character of the openings in the outer portions of the chamber walls is such that there is little liability of their being choked up or clogged by the absorbent material. At the end of the bearing 15 the housing has a cavity 22 which is preferably annular in form so that it extends completely about the shaft 5, and this shaft may, if desired, be provided with circumferential grooves 23 in line with the respective cavities. Leading from each cavity 23 to the openings at the converging corners of the chamber are channels 24, the arrangement being such that in any position in which the motor may be mounted one of the channels from each cavity will extend downwardly therefrom to the lower portion of the chamber 17 and the oil will flow by gravity from the cavity to the chamber, where it will be again taken up by the absorbent material and delivered to the bearing. The outer wall of the housing has formed therein openings 25 which communicate with the adjacent channels 24, above and below the bearing, to permit the escape of any excess oil which may accumulate in the channel and thus prevent this oil from entering the motor. As will be noted from the arrangement of the openings 25, as shown in Fig. 1, one of these openings will be below the level of the bearing in any position in which the motor may be mounted. Each housing has on opposite sides thereof filling openings 26, the uppermost of which is provided with an oil cup 27 and the lowermost of which is closed by a plug 28. When the motor is inverted the oil cup is inserted in the opening here shown as closed by the plug and the plug is inserted in the opening here shown as carrying the oil cup, thus arranging the oil cup in an elevated position so that it will deliver oil to the chamber 17 with which it communicates.

It will be apparent from the foregoing description that the lubricating devices will operate with full efficiency with the motor mounted in any one of its plurality of positions and with the armature rotating in either direction. In any position of the motor the oil from the lubricant chamber 17 will enter the bearing, pass through the same and through cavities 22 at the ends of the bearing, thence through the downwardly extending channels 24 to the lowermost portion of the chamber 17, and will enter the chamber through the slots 20 and 21, and will again be taken up by the absorbent material within the chamber and again delivered to the bearing, thus providing for a constant uniform lubrication of the bearing.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a motor having means for mounting the same in any one of a plurality of positions, a bearing for the motor shaft and a housing in which said bearing is mounted, said housing having a lubricant chamber extending about said bearing and said bearing having an opening leading from said chamber to the bearing surface of said shaft, said housing also having a cavity at the end of said bearing to receive lubricant from said bearing, and channels leading from said cavity to said chamber, said channels being so arranged that when said motor is in any one of said plurality of positions one or another of said channels will extend downwardly from said cavity to said chamber.

2. In a motor having means for mounting the same in any one of a plurality of positions, a bearing for the motor shaft and a housing in which said bearing is mounted, said housing having a substantially rectangular chamber extending about said bearing and said bearing having an opening leading from said chamber to the bearing surface of said shaft, said housing also having a cavity at the end of said bearing to receive lubricant from said bearing, and channels leading from said cavity to diagonally opposite corners of said chamber.

3. In a motor having means for mounting the same in any one of a plurality of positions, a bearing for the motor shaft and a housing in which said bearing is mounted, said housing having a lubricant chamber extending about said bearing and adapted to contain absorbent material and said bearing having an opening leading from said chamber to the bearing surface of said shaft, the walls of said chamber converging outwardly on opposite sides of said bearing and having openings in the outer portions thereof, said housing also having a cavity at the end of said bearing to receive lubricant therefrom, and channels leading from said cavity to the respective openings in the outer portions of the converging walls of said chamber.

4. In a motor having means for mounting the same in any one of a plurality of positions, a bearing for the motor shaft and a housing in which said bearing is mounted, said housing having a lubricant chamber extending about said bearing and adapted to contain absorbent material and said bearing having an opening leading from said chamber to the bearing surface of said shaft, the walls of said chamber converging outwardly on opposite sides of said bearing, the outermost portions of each pair of said converging walls having intersecting slots therethrough, said housing also having a cavity at the end of said bearing to receive lubricant therefrom, and channels leading from said cavity to the slots in the respective pairs of converging walls of said chamber.

5. In a motor having means for mounting the same in any one of a plurality of positions, a bearing for the motor shaft and a housing in which said bearing is mounted, said housing having a substantially rectangular lubricant chamber adapted to contain absorbent material, the walls of said chamber converging toward diametrically opposite corners thereof and having openings in the outer portions thereof, said bearing having openings leading from said chamber to the bearing surface of said shaft, said housing also having an annular cavity at the end of said bearing to receive lubricant from said bearing, and channels leading from said cavity to the respective openings at opposite corners of said chamber.

6. In a motor having means for mounting the same in any one of a plurality of positions, a bearing for the motor shaft and a housing in which said bearing is mounted, said housing having a lubricant chamber adapted to contain absorbent material and said bearing having openings leading from said chamber to the bearing surface of said shaft, the walls of said chamber converging outwardly on opposite sides of said bearing and having openings in the outer portions thereof, said housing also having annular cavities at the respective ends of said bearing, and channels leading from each cavity to the respective openings in the converging walls of said chamber.

7. In a motor having means for mounting the same in any one of a plurality of positions, a bearing for the motor shaft and a housing in which said bearing is mounted, said housing having a lubricant chamber adapted to contain absorbent material and said bearing having openings leading from said chamber to the bearing surface of said shaft, the walls of said chamber converging outwardly on opposite sides of said bearing and having openings in the outer portions thereof, said housing also having annular cavities at the respective ends of said bearing, and channels leading from each cavity to the respective openings in the converging walls of said chamber, the outer wall of said housing having openings on opposite sides of said shaft communicating with the adjacent channels.

8. In a motor comprising substantially rectangular end members and a stator substantially rectangular in cross section and arranged between and supported by said end members, bearings for the motor shaft carried by the respective end members, each of said end members having a housing within which said bearing is arranged, each housing having a lubricant chamber extending about said bearing and substantially rectangular in shape, the several walls of said lubricant chamber being substantially parallel with the corresponding walls of said end member, said bearing having an opening leading from said chamber to the bearing surface of said shaft and said housing having a cavity at the end of said bearing, and channels leading from said cavity to diametrically opposite corners of said chamber.

In testimony whereof, I affix my signature hereto.

GEORGE H. LELAND.